United States Patent [19]

Nyssen et al.

[11] Patent Number: 6,077,339
[45] Date of Patent: *Jun. 20, 2000

[54] PIGMENT PREPARATIONS USEFUL FOR INK-JET PRINTING

[75] Inventors: Roger Nyssen, Dormagen; Dirk Pfützenreuter; Rolf Richter, both of Leverkusen; Fritz Puchner, Köln; Karin Hassenrück, Düsseldorf, all of Germany

[73] Assignees: Bayer Aktiengesellschaft, Leverkusen, Germany; Bayer Corporation, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/954,603

[22] Filed: Oct. 20, 1997

[30] Foreign Application Priority Data

Oct. 31, 1996 [DE] Germany ............... 196 44 077
Mar. 25, 1997 [DE] Germany ............... 197 12 486

[51] Int. Cl.⁷ .................................................. C09D 11/02
[52] U.S. Cl. .................................. 106/31.77; 106/31.78; 106/496; 106/498
[58] Field of Search .......................... 106/31.6, 31.78, 106/31.77, 31.79, 31.8, 496, 498

[56] References Cited

U.S. PATENT DOCUMENTS

| | | | |
|---|---|---|---|
| 4,622,391 | 11/1986 | Lorenz et al. | 534/707 |
| 4,628,082 | 12/1986 | Lorenz et al. | 534/707 |
| 4,655,786 | 4/1987 | Navratil et al. | 8/475 |
| 5,009,668 | 4/1991 | Berendt et al. | 8/557 |
| 5,091,532 | 2/1992 | Kaletta et al. | 544/296 |
| 5,177,209 | 1/1993 | Wagner et al. | 544/300 |
| 5,221,334 | 6/1993 | Ma et al. | 106/31.6 |
| 5,326,872 | 7/1994 | Wagner et al. | 544/300 |
| 5,555,008 | 9/1996 | Stoffel et al. | 347/100 |
| 5,755,875 | 5/1998 | Zambounis et al. | 106/498 |
| 5,810,266 | 9/1998 | Nyssen et al. | 241/5 |
| 5,885,662 | 1/1999 | Brand et al. | 106/498 |

FOREIGN PATENT DOCUMENTS

| | | |
|---|---|---|
| 3641677 | 6/1988 | Germany . |
| 195 35 246 | 3/1997 | Germany . |
| 2005733 | 4/1979 | United Kingdom . |
| 97/43351 | 11/1997 | WIPO . |

OTHER PUBLICATIONS

Herbst, Hunger: Industrielle Organische Pigmente [Industrial Organic Pigments], VCM, Verlagsgesellschft, Weinheim (month unavailable) 1987, pp. 135–136.

*Primary Examiner*—Helene Klemanski
*Attorney, Agent, or Firm*—Joseph C. Gil; Richard E.L. Henderson

[57] ABSTRACT

The present invention relates to a method for ink-jet printing with a printing ink containing a pigment preparation containing (a) water
(b) a dispersing agent, and
(c) at least one pigment consisting of a barbituric acid substituted by radicals containing methine or azo groups or a derivative thereof, preferably present as a salt or a complex, a solid solution, an inclusion compound, or an intercalation compound.

18 Claims, No Drawings

PIGMENT PREPARATIONS USEFUL FOR INK-JET PRINTING

The invention relates to a method for ink-jet printing with a printing ink containing a pigment preparation and pigment preparations of specific organic pigments that are useful as printing inks for ink-jet printing.

Aqueous printing inks for ink-jet printing based both on water-soluble organic dyestuffs and on organic colored pigments are known and are described in many publications. Compared with soluble dyestuffs, pigments generally produce an improved lightfastness in the resultant print-outs. However, it is also known that ink-jet prints of most pigments do not achieve the same brilliance as those of dyestuffs. Although the brilliance of the prints can be improved by use of a particularly high fine distribution of the pigment particles, this improvement is generally accompanied by a loss in lightfastness properties. Cf. Herbst, Hunger: Industrielle Organische Pigmente [Industrial Organic Pigments], VCM, Verlagsgesellschaft, Weinheim (1987), pages 135–136.

According to European Patent Application 633,142 (U.S. Pat. No. 5,555,008), the brilliance can be improved, for example, by a suitable choice of additives for the inks or by a suitable choice of printing substrates, such as, for example, appropriately coated papers. The problem of providing both brilliant and light-fast pigments for ink-jet printing, however, has not yet been solved satisfactorily by the prior art methods. This applies particularly to the yellow color shade range.

Despite the large number of publications, the above-mentioned object has not yet been satisfactorily achieved. Moreover, only a very few publications list examples of yellow pigments that are indeed suitable in principle in their lightfastness properties for conventional ink-jet printing, but which do not satisfy the lightfastness properties required for higher quality fields of ink-jet printing use, such as photographic image reproduction (photoreproduction, for example, for use outside or for display). E.g., European Patent Application 518,225 (U.S. Pat. No. 5,221,334).

SUMMARY OF THE INVENTION

The present invention, therefore, relates to a method comprising ink-jet printing with a printing ink containing a pigment preparation comprising
(a) water,
(b) a dispersing agent, and
(c) at least one pigment consisting of a barbituric acid substituted by radicals containing methine or azo groups or a derivative thereof, said pigment preferably being present as a salt or a complex, a solid solution, an inclusion compound, or an intercalation compound.

In a particularly preferred embodiment, component (c) is one or more pigments having the formulas (I) to (III) or tautomeric forms thereof

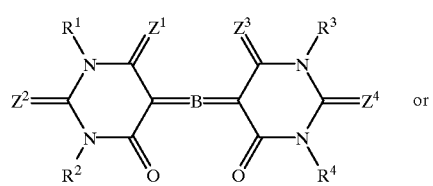

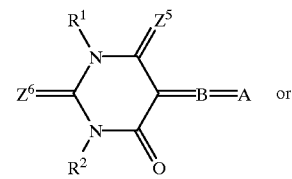

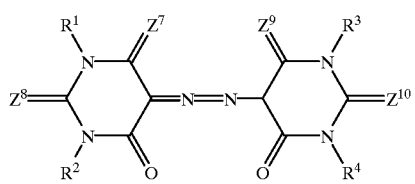

wherein
B is an isoindoline group having the formula

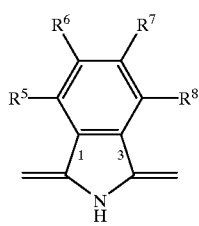

wherein the double bonds are linked respectively through the 1- and 3-positions of the isoindoline group;
A is a cyanomethylene group having the formula

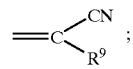

$Z^1$ to $Z^{10}$ are independently O or $NR^{10}$;
$R^1$, $R^2$, $R^3$, and $R^4$ are independently hydrogen, alkyl (preferably $C_1$–$C_6$ alkyl), cycloalkyl (preferably $C_5$–$C_8$ cycloalkyl), aryl (preferably phenyl or substituted phenyl), aralkyl (preferably ($C_6$–$C_{10}$ aryl)($C_1$–$C_4$ alkyl) such as benzyl or phenethyl), or heteroaryl;
$R^5$, $R^6$, $R^7$, and $R^8$ are independently hydrogen, halogen (preferably F, Cl, or Br), $C_1$–$C_6$ alkyl, $C_1$–$C_6$ alkoxy, or $C_6$–$C_{10}$ aryloxy;
$R^9$ is an electron-withdrawing group; and
$R^{10}$ is hydrogen or cyano.

DETAILED DESCRIPTION OF THE INVENTION

Pigments of formula (I) are known, for example, from German Offenlegungsschrift 3,935,858 (U.S. Pat. No. 5,091,532), pigments of formula (II) are known, for example, from U.S. Pat. No. 5,177,209, and pigments of formula (III) are known, for example, from European Patent Application 74,515 (U.S. Pat. No. 4,628,082).

As used herein, the term "alkyl" refers to straight or branched chain aliphatic hydrocarbon groups. Examples of the preferred $C_1$–$C_6$ alkyl groups are methyl, ethyl, propyl, butyl, pentyl, hexyl, and the isomeric forms thereof. The term "alkoxy" refers to straight or branched chain alkyl oxy groups. Examples of the preferred $C_1$–$C_6$ alkoxy groups are methoxy, ethoxy, propoxy, butoxy, pentyloxy, hexyloxy, and the isomeric forms thereof. The term "cycloalkyl" refers to cycloaliphatic hydrocarbon groups. Examples of the preferred $C_5$–$C_7$ cycloalkyl are cyclopentyl, cyclohexyl, and cycloheptyl. The term "aryl" refers to aromatic hydrocarbon groups, including aromatic hydrocarbon groups substituted with groups such as alkyl, alkoxy, halogen, hydroxy (including tautomeric oxo forms), alkoxycarbonyl, aryloxycarbonyl, cyano, and nitro groups. Examples of the preferred aryl groups are phenyl and substituted derivatives thereof. The term "aryloxy" refers to aromatic hydrocarbon groups attached through an oxygen atom. Examples of the preferred $C_6$–$C_{10}$ aryloxy groups are phenoxy and naphthoxy and derivatives thereof in which the aryl portion is substituted as described above for "aryl" groups. The term "aralkyl" (or, "arylalkyl") refers to alkyl groups bearing aryl group as substituents. Examples of the preferred ($C_6$–$C_{10}$ aryl)($C_1$–$C_4$ alkyl) groups are benzyl or phenethyl. The term "heteroaryl" refers to aromatic groups, preferably five- or six-membered aromatic groups, having one or more ring heteroatoms, such as nitrogen, oxygen, and sulfur, and fused ring analogs thereof. The term "heteroaryl" also refers to heteroaryl groups further substituted with hydroxy (including tautomeric oxo forms), halogen, alkyl, alkoxy, alkoxycarbonyl, or aryloxycarbonyl.

The group $R^9$ preferably represents a group in which the Hammett substituent constant σ (para) is greater than zero. A corresponding list of Hammett substituent constants can be found, for example, in Sykes, Reaktionsmechanismen der organischen Chemie [Reaction Mechanisms of Organic Chemistry], 9th edition, Weinheim VCM Verlagsgesellschaft, 1988, or can be determined by known methods. Examples of suitable electron-withdrawing groups include —CN, —COOH and esters and amides thereof, aldehyde and ketone carbonyl, —$SO_3H$ and esters and amides thereof, —$NO_2$, —NO, —ONO, halogen, ammonium groups, aryl, and heteroaryl.

Preferred pigments of formula (I) are symmetric isoindoline pigments corresponding to formula (IV)

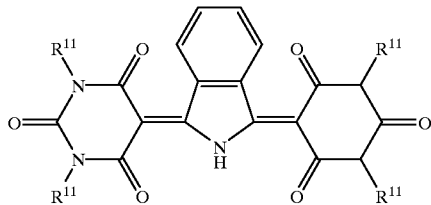

(IV)

wherein $R^{11}$ is hydrogen, $C_1$–$C_6$ alkyl, or phenyl. Especially preferred pigments of formula (I) correspond to formula (IV) in which $R^{11}$ is hydrogen.

Preferred pigments of formula (II) are asymmetric isoindoline pigments corresponding to formula (V)

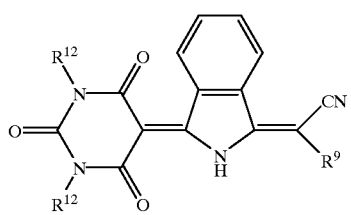

(V)

wherein
  $R^9$ is —CN, aminocarbonyl or aminocarbonyl substituted with $C_1$–$C_6$ alkyl, $C_5$–$C_7$ cycloalkyl, aralkyl (preferably ($C_6$–$C_{10}$ aryl)($C_1$–$C_4$ alkyl)), or $C_6$–$C_{10}$-aryl) (more preferably —$CONHCH_3$), $C_1$–$C_6$ alkoxycarbonyl, $C_6$–$C_{10}$ aryloxycarbonyl, or heteroaryl such as heteroaryl groups having the formulas (VI) or (VII)

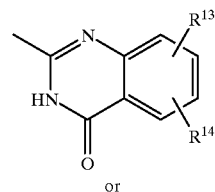

(VI)

or

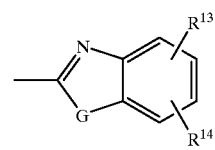

(VII)

wherein
  $R^{13}$ and $R^{14}$ are independently hydrogen, halogen (preferably Cl, Br, or F), $C_1$–$C_6$ alkyl, $C_1$–$C_6$ alkoxy, or $C_1$–$C_6$ alkoxycarbonyl, or $R^{13}$ and $R^{14}$ together form a fused-on benzene ring,
  G is O, S, NH, or N($C_1$–$C_4$ alkyl), and
  $R^{12}$ is hydrogen, $C_1$–$C_6$ alkyl, or phenyl.
  Especially preferred pigments of formula (V) are those in which $R^9$ is —$CONHCH_3$ and $R^{12}$ has the above-mentioned meaning, particularly pigments in which $R^9$ is —$CONHCH_3$ and $R^{12}$ is hydrogen.

Preferred pigments are salts, complexes, inclusion compounds, solid solutions, and intercalation compounds corresponding to the pigments of formula (III). Such pigments are known, for example, from European Patent Application 74,515 (U.S. Pat. No. 4,628,082). Preferred salts and complexes of the compounds of the formula (III) are the salts and complexes of the corresponding mono-, di-, tri-, and tetra-anions with the metals Li, Cs, Mg, Cd, Co, Al, Cr, Sn, and Pb, and most preferably with the metals Na, K, Ca, Sr, Ba, Zn, Fe, Ni, Cu, and Mn. The nickel salts and complexes and solid solutions and intercalation and inclusion compounds thereof are of particular importance. An inclusion compound, intercalation compound, or solid solution of a salt or a complex of azobarbituric acid (particularly of the azobarbituric acid-nickel 1:1 complex) is particularly preferred.

The included compound is preferably a cyclic or acyclic organic compound, preferably a carboxamide or sulfonamide, urea or substituted urea, or a heterocyclic compound, especially 2,4,6-triamino-1,3,5-triazine, acetoguanamine, or benzoguanamine.

Preferred pigments of formula (III) correspond to pigments of formulas (VIII) and (IX)

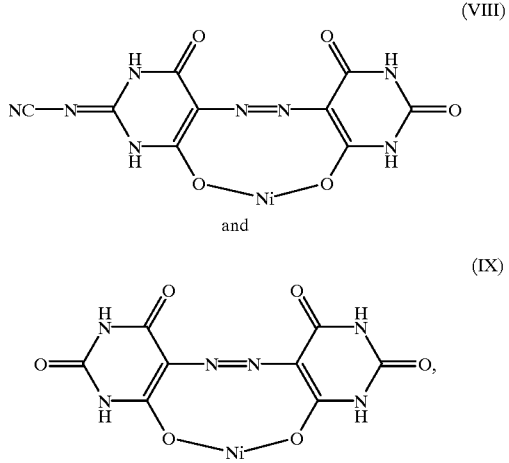

especially as their inclusion compounds or intercalation compounds, where 2,4,6-triamino-1,3,5-triazine, acetoguanamine, and benzoguanamine are preferred as the included compound.

Particularly preferred pigments of formulas (I) to (III) and mixtures thereof are those of which the prints cover the color shade range which, in the coloristic sense, can preferably be described by the color shade value range h, as determined with the parameters of the CIELAB system (1976), from 80 to 100° (preferably from 85 to 100°). CIELAB system (1976) is the calorimetric classification system described, for example, by A. Brockes et al. in "Farbmessung in der Textilindustrie" ["Color Measurement in the Textile Industry"], JSSN 0722-0391, 1986 Mitteilungen flir die Farbstoffe verarbeitende Industrie [Communications for the Dyestuffs Processing Industry], volume 24.

Dispersing agents in the context of this invention are understood as meaning substances which stabilize the pigment particles in their finely particulate form in aqueous media. The term "finely particulate" is preferably understood as meaning a fine division of 0.001 to 5 μm (preferably 0.005 to 1 μm and more preferably 0.005 to 0.5 μm).

Suitable dispersing agents can be anionic, cationic, amphoteric, or nonionic.

Suitable anionic dispersing agents include condensation products of aromatic sulfonic acids with formaldehyde, such as condensation products of formaldehyde and alkylnaphthalenesulfonic acids or of formaldehyde, naphthalenesulfonic acids, and/or benzenesulfonic acids, and condensation products of optionally substituted phenol with formaldehyde and sodium bisulfite. Dispersing agents from the group consisting of sulfosuccinic acid esters and alkylbenzenesulfonates are also suitable. Ligninsulfonates, for example, those which are obtained by the sulfite or kraft process, are also particularly suitable. Such compounds are preferably products that are partly hydrolyzed, oxidized, propoxylated, sulfonated, sulfomethylated, or desulfonated and fractionated by known processes, for example, according to molecular weight or according to the degree of sulfonation. Mixtures of sulfite and kraft ligninsulfonates also have a good dispersing action. Ligninsulfonates having an average molecular weight of between 1000 and 100,000, a content of active ligninsulfonate of at least 80%, and preferably a low polyvalent cation content are particularly suitable. The degree of sulfonation can vary within wide limits.

Suitable nonionic dispersing agents include reaction products of alkylene oxides with alkylatable compounds, such as fatty alcohols, fatty amines, fatty acids, phenols, alkylphenols, arylalkylphenols (for example, styrene-phenol condensates), carboxamides, and resin acids. Such compounds include ethylene oxide adducts obtained as reaction products of ethylene oxide with a) saturated and/or unsaturated fatty alcohols having 6 to 20 C atoms, or b) alkylphenols having 4 to 12 carbon atoms in the alkyl group, or c) saturated and/or unsaturated fatty amines having 14 to 20 carbon atoms, or d) saturated and/or unsaturated fatty acids having 14 to 20 carbon atoms, or e) hydrogenated and/or non-hydrogenated resin acids.

Suitable ethylene oxide adducts include the alkylatable compounds mentioned under a) to e) with 5 to 120 mol (preferably 5 to 100, more preferably 5 to 100, and more preferably 5 to 60, and most preferably 5 to 30 mol) of ethylene oxide.

Suitable dispersing agents also include mixtures, some of which are disclosed in German application 195 35 246, of (I) alkoxylation products of at least one styrene-phenol condensate, said alkoxylation products having formula (X)

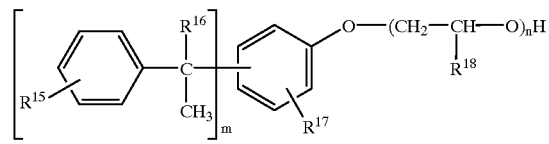

wherein
$R^{15}$ is hydrogen or $C_1$–$C_4$ alkyl,
$R^{16}$ is hydrogen or $CH_3$,
$R^{17}$ is hydrogen, $C_1$–$C_4$ alkyl, $C_1$–$C_4$ alkoxy, $C_1$–$C_4$ alkoxycarbonyl, or phenyl,
m is a number from 1 to 4,
n is a number from 6 to 120, and
$R^{18}$ is independently for each —($CH_2$—$CHR^{18}$—O)— unit hydrogen, $CH_3$, or phenyl, with the proviso that either (i) 0 to 60% of the total $R^{18}$ is $CH_3$ and 40 to 100% of the total $R^{18}$ is hydrogen or (ii) 0 to 60% of the total $R^{18}$ is phenyl and 40 to 100% of the total $R^{18}$ is hydrogen, and (II) esters of such alkoxylation products (X), said esters having formula (XI)

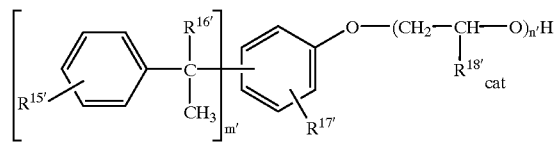

wherein

R$^{15'}$, R$^{16'}$, R$^{17'}$, R$^{18'}$, m', and n' are defined in the same manner as, but independently from, R$^{15}$, R$^{16}$, R$^{17}$, R$^{18}$, m, and n, respectively, X is —SO$_3^-$, —SO$_2^-$, —PO$_3^{2-}$, or —CO—(R$^{19}$)—COO$^-$, cat is a cation selected from the group consisting of H$^+$, Li$^+$, Na$^+$, K$^+$, NH$_4^+$, and HO—CH$_2$CH$_2$—NH$_3^+$ with the proviso that two cat must present if X is —PO$_3^{2-}$, and R$^{19}$ is a divalent aliphatic or aromatic group (preferably C$_1$–C$_4$ alkylene, particularly ethylene, C$_2$–C$_4$ monounsaturated group, particularly acetylene, or optionally substituted phenylene, particularly orthophenylene, optionally substituted with C$_1$–C$_4$ alkyl, C$_1$–C$_4$ alkoxy, C$_1$–C$_4$ alkoxycarbonyl, or phenyl).

Mixtures containing compounds of formulas (X) and (XI) are known, for example, from German application 19,535,246.

The present invention further relates to novel embodiments of the compounds of the formula (XI) in which X is a group having the formula —CO—(R$^{19}$)—COO$^-$ and R$^{15'}$, R$^{16'}$, R$^{17'}$, R$^{18'}$, R$^{19'}$, cat, m', and n' have the above-mentioned meanings. The present invention also relates to a process for the preparation of the novel compounds of the formula (XI) according to the invention comprising reacting (1) a corresponding compound of formula (X) in which R$^{15}$, R$^{16}$, R$^{17}$, R$^{18}$, m, and n have the same meaning as the corresponding groups R$^{15'}$, R$^{16'}$, R$^{17'}$, R$^{18'}$, m', and n', respectively, with (2) dicarboxylic acids of formula (XII)

HOOC—(R$^{19}$)—COOH          (XII)

or derivatives thereof (preferably anhydrides thereof) wherein R$^{19}$ has the above-mentioned meaning.

Corresponding reactions can be carried out analogously to the process disclosed in German application 19,535,246.

To prepare esters of the formula (XI) which are important according to the invention, the oxyalkylation products of the formula (X) are reacted with polybasic oxygen acids or derivatives thereof. Derivatives of such oxygen acids are, for example, their acid anhydrides, acid halides, acid esters or acid amides. Important examples of such acids or derivatives thereof are: chlorosulphonic acid, amidosulphonic acid, sulphamic acid, phosphorus pentoxide or phosphorus oxytrichloride. The esterification reactions are carried out in a manner known to the expert; these reactions result in monoesters of the alkoxylation products (X) mentioned, which, if an acid derivative has been used as the starting substance, can be converted into the free acid or the salts of such half-esters of the formula (XI) by water, an alkali metal hydroxyide or monoethanolamine.

In principle, oxyalkylation products of the formula (X) can be employed in addition to half-esters (XI), oxyalkylation products other than those according to (X) being used as starting substances to form the half-esters (XI). In the formulas (X) and (XI), this is expressed by the substituents and the indices in (XI) in each case carrying an apostrophe ('). Preferably, however, half-esters (XI) which are derived from oxyalkylation products (X) in which, instead of R$^{15'}$, R$^{16'}$, R$^{17'}$, R$^{18'}$, m' and n', the corresponding radicals and indices R$^{15}$, R$^{16}$, R$^{17}$, R$^{18}$, m and n thus occur, are used. Such mixtures of (X) and (XI) can be prepared by leaving out a portion of the oxyalkylation product which is constituent X and esterifying another portion of (X) in the manner mentioned to give (XI), if appropriate neutralizing the product and then mixing the two contents. It is of course also possible, and is an advantageous variant, to react an alkoxylation product (X) with less than the stoichiometric amount of acid or acid derivative and thus automatically to obtain a mixture of constituents (X) and (XI).

The particularly preferred compounds of the formula (XI) can be obtained by reaction of compounds of the corresponding formula (X) with succinic, maleic, or phthalic anhydride.

The present invention also relates to mixtures comprising at least one compound of the formula (XI), wherein X is a group having the formula —CO—(R$^{19}$)—COO$^-$ and R$^{19}$ has the above-mentioned meaning, and at least one compound of formula (X).

Such mixtures according to the invention preferably contain 5 to 99% by weight of compound (XI) and 1 to 95% by weight of compound (X).

The invention also relates to the surfactant mixtures, which are not disclosed in unpublished German application 19,535,246, comprising a compound of the formula (X) and a compound of the formula (XI) wherein R$^{15}$, R$^{16}$, R$^{17}$, R$^{18}$, R$^{15'}$, R$^{16'}$, R$^{17'}$, R$^{18'}$, n, m, n', and m' have the above-mentioned meanings, and X represents —SO$_3^-$, —SO$_2^-$, or —PO$_3^{2-}$, excluding those mixtures in which n or n' is a number equal to or less than 3 or m or m' is a number from 6 to 100.

The compounds of the formula (XI) in the broadest meaning and their mixtures with the compounds of the formula (X) on which they are based are, moreover, outstandingly suitable as dispersing agents for stabilizing even pigments other than those mentioned herein for ink-jet printing inks. Suitable pigments in this connection include, for example, carbon blacks (particularly acidic to alkaline carbon blacks from the group consisting of furnace or gas carbon blacks and chemically or physically modified or after-treated carbon blacks), inorganic pigments, such as zinc sulfides, ultramarine, iron oxides, cobalt blue, and chromium oxide pigments, finely particulate oxide pigments, such as silicon dioxide, titanium dioxide, nickel oxides, chromium/antimony/titanium dioxides, and aluminum oxide, and finely particulate metals, such as copper, iron, or aluminum, and organic colored pigments, such as those of the azo, diazo, polyazo, anthraquinone, and thioindigo series, as well as other polycyclic pigments such as phthalocyanine, quinacridone, dioxazine, isoindolinone, naphthalenetetracarboxylic acid, and perylene and perylenetetracarboxylic acid pigments, and pigments of the perinone, indigoid, thioindigoid, and diketopyrrolopyrrole series, metal complex pigments of azo, azomethine, or methine dyestuffs, or laked dyestuffs, such as Ca, Mg, and Al lakes of dyestuffs containing sulfonic acid groups and/or carboxylic acid groups.

Possible polymeric dispersing agents include water-soluble and water-emulsifiable types, for example, homopolymers and copolymers, such as random or block copolymers.

Particularly preferred dispersing agents are polymeric dispersing agents, such as, for example, AB, BAB, and ABC block copolymers. In AB or BAB block copolymers, the A segment is a hydrophobic homopolymer or copolymer that ensures bonding to the pigment and the B block is a hydrophilic homopolymer or copolymer or a salt thereof that ensures dispersion of the pigment in the aqueous medium. Such polymeric dispersing agents and their synthesis are known, for example, from European Patent Applications 518,225 and 556,649 (U.S. Pat. No. 5,221,334).

Dispersing agents are preferably used in the pigment preparation in an amount of 0.1 to 100% by weight (preferably 0.5 to 60% by weight), based on the pigment employed.

In a preferred embodiment, the pigment preparation used according to the invention comprises (a) 10 to 98% by weight (preferably 30 to 98% by weight) of water, (b) 0.1 to 100% by weight (preferably 0.5 to 60% by weight), based on the pigment employed, of dispersing agent, and (c) 0.2 to 60% by weight (preferably 0.2 to 20% by weight, more preferably 0.2 to 20% by weight, and most preferably 0.2 to 10% by weight) of at least one pigment having the formulas (I) to (III).

The pigment preparations used according to the invention can, of course, also contain further additives in addition to components (a), (b) and (c).

Suitable optional further additives are the additives customary for printing inks for ink-jet printing.

Thus, for example, organic solvents can be present as a further component (d). Water-soluble organic solvents are particularly suitable. Those having a solubility of greater than 0.5 g/100 g of water are preferred.

Suitable organic solvents include aliphatic $C_1$–$C_4$ alcohols, such as methanol, ethanol, isopropyl alcohol, n-propanol, n-butanol, isobutyl alcohol, or tert-butyl alcohol; aliphatic ketones, such as acetone, methyl ethyl ketone, methyl isobutyl ketone, or diacetone alcohol; polyols, such as ethylene glycol, propylene glycol, butylene glycol, diethylene glycol, triethylene glycol, trimethylolpropane, polyethylene glycols having an average molecular weight of 100 to 4000 g/mol (preferably 400 to 1500 g/mol), or glycerol; and monohydroxy ethers, preferably monohydroxyalkyl ethers (more preferably mono($C_1$–$C_4$ alkyl) glycol ethers), such as ethylene glycol monoalkyl or monomethyl ethers, diethylene glycol monomethyl ether, diethylene glycol monoethyl ether, diethylene glycol monobutyl ether, dipropylene glycol monoethyl ether, thiodiglycol, or triethylene glycol monomethyl ether or monoethyl ether; as well as 2-pyrrolidone, N-methyl-2-pyrrolidone, N-ethylpyrrolidone, N-vinylpyrrolidone, 1,3-dimethylimidazolidone, dimethylacetamide, and dimethylformamide.

Mixture of the solvents mentioned above are also possible.

The amount of the organic solvent is preferably 1 to 40% by weight (more preferably 2 to 20% by weight), based on the pigment preparations. The amount of water and organic solvent is preferably 20 to 99% by weight (more preferably 30 to 97% by weight), based on the pigment preparations.

The pigment preparation can also contain agents for adjusting the viscosity of the ink, such as polyvinyl alcohol, polyvinyl pyrrolidone, methylcellulose, and other known agents, if they do not adversely affect the stability of the printing ink, the printing properties, and the drying properties on paper.

In addition to the components mentioned above, the pigment preparations used according to the invention as printing inks can also contain 0 to 15% by weight (preferably 0.5 to 10% by weight), based on the ink, of a surface-active agent. These surface-active agents can in principle be employed, for example, for regulating the surface tension of the ink, as well as for preventing dripping or leaking at the jet discharge surface of the printing head, and for adjusting the wetting and drying properties of the ink on various types of substrates (e.g., papers). Such surface-active agents are known in the form of commercially available products. It is important to choose surface-active agents that do not impair the stability of the pigment preparation or the printing head materials used.

The pigment preparation used according to the invention can also contain further ionic and nonionic auxiliaries. If the dispersing agent contains ionic groups, these auxiliaries should preferably be nonionic or have the same ionic character.

The pigment preparations used according to the invention can in principle also contain preservatives, light stabilizers, further surfactants and, if appropriate, pH regulators.

Examples of pH regulators are NaOH, ammonia, aminomethylpropanol, and N,N-dimethylaminoethanol.

Examples of preservatives are methyl- and chloromethyl-isothiazolin-3-one, benzisothiazolin-3-one, and mixtures thereof.

Examples of light stabilizers are UV absorbers.

The invention also relates to pigment preparations comprising (a) water, (b) a dispersing agent, (c) at least one pigment consisting of a barbituric acid substituted by radicals containing methine or azo groups or a derivative thereof, said pigments preferably being present as a salt or a complex, a solid solution, an inclusion compound, or an intercalation compound (preferably a pigment of formulas (I) to (III)), and (d) at least one organic solvent selected from the group consisting of: aliphatic $C_1$–$C_4$ alcohols (such as methanol, ethanol, isopropyl alcohol, n-propanol, n-butanol, isobutyl alcohol, or tert-butyl alcohol), aliphatic ketones (such as acetone, methyl ethyl ketone, methyl isobutyl ketone, or diacetone alcohol), polyols (such as ethylene glycol, propylene glycol, butylene glycol, diethylene glycol, triethylene glycol, trimethylolpropane, polyethylene glycol having an average molecular weight of 100 to 4000 g/mol (preferably 400 to 1500 g/mol), or glycerol), monohydroxy ethers (preferably monohydroxyalkyl ethers, more preferably mono($C_1$–$C_4$ alkyl)glycol ethers, such as ethylene glycol monoalkyl or monomethyl ethers, diethylene glycol monomethyl ether, diethylene glycol monoethyl ether, diethylene glycol monobutyl ether, dipropylene glycol monoethyl ether, thiodiglycol, or triethylene glycol monomethyl ether or monoethyl ether), 2-pyrrolidone, N-methyl-2-pyrrolidone, N-ethylpyrrolidone, N-vinylpyrrolidone, 1,3-dimethylimidazolidone, dimethylacetamide, and dimethylformamide.

The preferred embodiments of the individual components correspond to those mentioned above.

The invention further relates to pigment preparations comprising (a') water, (b') a compound of the formula (XI) wherein X is —CO—($R^{19}$)—COO⁻ and the other groups have the meanings given above, and (c') a pigment.

Pigment preparations that optionally contain the compound of formula (XI) as a mixture with a corresponding compound of formula (X) are preferred, the preferred amounts corresponding to those of component (b) of the above pigment preparation.

The preferred embodiments of component (c') and, where appropriate, an organic solvent of component (d'), correspond to the embodiments of components (c) and (d) of the pigment preparations described above.

The methods of use also correspond to those set out above, preferably as a printing ink for ink-jet printing as described above.

The invention further relates to preparation of the pigment preparations of the invention that are useful as printing inks for ink-jet printing wherein at least one pigment of formulas (I) to (III) is homogenized and subjected to wet comminution with a dispersing agent and, if appropriate, further additives.

In general, the pigment is thoroughly blended (i.e., introduced and homogenized) in powder form or in the form of the water-moist presscake together with some of the dispersing agent and water (preferably deionized water) to give a homogeneous ground suspension using, for example, a stirred vat, dissolver, or similar unit, if appropriate after a precomminution.

The ground suspension can also contain fractions of low-boiling solvents (having a boiling point less than 150° C.), which can be discharged by evaporation in the course of the subsequent fine grinding. However, the ground suspension can also contain fractions of higher-boiling solvents or further additives such as described above, for example, grinding auxiliaries or defoaming or wetting agents.

The wet comminution includes both the precomminution and the fine grinding. Here, the pigment concentration of the suspension is preferably above the desired concentration of the finished pigment preparation or printing ink. The desired end concentration of pigment is preferably established only after wet comminution. After precomminution, grinding takes place to the desired particle fine division of 0.001 to 5 $\mu$m (preferably 0.005 to 1 $\mu$m). Possible units for this grinding step include, for example, kneaders, roll mills, kneading screws, ball mills, rotor-stator mills, dissolvers, corundum disc mills, vibratory mills, and, particularly, high-speed, continuously, or discontinuously charged stirred ball mills containing grinding bodies having a diameter of 0.1 to 2 mm. Suitable grinding bodies can be made of glass, ceramic, or metal (for example, steel). The grinding temperature is preferably in the range from 0 to 250° C., but is generally room temperature, especially below the turbidity point of the dispersing agent of component (b) and of the optional surface-active agent.

In a similarly preferred procedure, the grinding can be carried out partly or completely in a high pressure homogenizer or in a so-called jet disperser (known from German application 19,536,845, which has not previously been published), which means that the content of abraded grinding-body material in the suspension or the release of soluble substances from the grinding bodies (for example, ions from glass bodies) can be minimized or avoided completely.

The resultant pigment preparation can diluted by mixing into and homogenized in water in a known manner with any remaining amounts of dispersing agent and any further additives and adjusting to the desired final pigment concentration or color strength of the preparation or printing ink. If appropriate, some of the dispersing agent can also be added, for example, to avoid reagglomeration of fine pigment particles in the dilution.

A process for preparing the pigment preparations in which sufficient dispersing agent for stabilization is provided during the grinding step for preparation of the pigment concentrate is of particular advantage. Thereafter, or after dilution with water, a dispersing agent in solution that is not adsorbed on the pigment and/or excess surface-active agents are preferably removed and the desired pigment preparation is then established by adding the remaining portions of the pigment preparati on.

A process for removing dispersing agent in solution includes, for example, centrifugation of the suspension and subsequent decanting of the supernatant.

Other additives, such as polyurethane polymers or acrylic polymers, can also be added to improve waterfastness, if appropriate. Such additives can be both water-soluble and water-emulsifiable in nature or can be soluble in one of the components contained in (d).

In a preferred procedure, mixing and homogenization of the pigment preparations are carried out using a jet disperser or high pressure homogenizer in order to suppress the formation of foam and to avoid possible reagglomeration.

The desired pigment preparations are adjusted during preparation to the desired viscosity, color strength, color shade, density, and surface tension of the ink.

Before using the pigment preparations as printing inks, the inks are subjected to fine filtration, if appropriate, for example, by means of 1 to 5 $\mu$m membrane or glass filters.

The physical properties of the inks are generally adjusted to the use in customary ink-jet printers, where the surface tension should be between 20 and 70 mN/m and the viscosity should be less than 20 mPa·s (preferably 0.5 to 10 mPa·s).

Printing inks prepared and used according to the invention, when used as a printing ink in ink-jet printing, print with excellent lightfastness and brilliance, and also have as advantages outstanding dispersion and storage stability in a wide temperature range, no so-called coagulation or clogging or blocking in the printing head, high fastness to water and migration of the prints on various substrates (for example, wood-free paper, medium quality paper, sized and coated paper, polymeric films, and transparent films for overhead projection), and no bleeding in multicolored printing, even when used together with dyestuff inks or other pigmented inks.

The pigment preparations described above can be used as printing inks for ink-jet printing.

Ink-jet printing is known and is in general carried out by introducing the printing ink into a receiving vessel of an ink-jet printing head and spraying it onto the substrate in small droplets. Ejection of the ink in droplet form is preferably effected by a piezoelectric crystal, a heated cannula (bubble-jet or thermal-jet process), or mechanical increase in the pressure, with pressure being exerted on the ink system and ink drops thus being flung out. During this operation, the droplets from one or more small nozzles are propelled at the substrate, such as paper, wood, textiles, plastic, or metal, in a controlled manner. The individual droplets are collected on the substrate as written symbols or graphic patterns by electronic control.

A process in which tiny volumes are brought in the form of drops onto a substrate by means of electrostatic deflection from an inkjet is also possible.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

Preparation of a Particularly Preferred Inclusion Compound of the Pigment of Formula (IX)

25 g of benzenesulfonic acid hydrazide, 200 ml of water, 20 ml of 10 N hydrochloric acid, and 1.25 g of a condensation product of stearic acid with taurine were stirred for 30 minutes. After 60 g of ice were added, 34 ml of an aqueous sodium nitrite solution having a content of 30 g of sodium nitrite per 100 ml of solution were added dropwise over a period of about 30 minutes. The mixture was stirred for 30 minutes while an excess of nitrite was maintained. The excess nitrite was destroyed with a small amount of amidosulfonic acid and the mixture was neutralized with about 5 ml of 10 N sodium hydroxide solution. An emulsion of benzenesulfonic acid azide was obtained.

38.2 g of barbituric acid were added to the emulsion thus prepared, after which the mixture was stirred for 10 minutes and the pH was adjusted to 8 with about 33 ml of 10 N sodium hydroxide solution. The resultant mixture was stirred at 50° C. for 2 hours, subsequently adjusted to pH 4.8 with 3 ml of acetic acid and about 14 ml of 10 N hydrochloric acid, and heated at 70° C. for a further 1 hour and at 80° C. for 3 hours. A suspension of the sodium salt of azobarbituric acid was obtained, and about 22 g of the benzenesulfonic acid amide formed as a by-product were also additionally present in dissolved form.

A suspension prepared in this manner was heated at 95° C. to 100° C. and the solid was collected by suction filtration and washed with about 1 liter of boiling, hot water in several portions. A presscake of the sodium salt of azobarbituric acid was obtained.

The presscake thus prepared was stirred with 500 ml of water. A solution of 34.5 gof $NiCl_2 \cdot 6 H_2O$ and 13 g of anhydrous sodium acetate in 100 ml of water was added dropwise at 80° C. over a period of about 5 minutes. The mixture was stirred at 80° C. for 1 hour, 42 g of melamine were added, the mixture was stirred at 80° C. for a further 1 hour and at 95° C. for 2 hours, and the still hot solid was subsequently collected by suction filtration and washed with hot water.

A water-moist pigment presseake having a dry substance content of 42.6% by weight was obtained.

Examples 2 to 4

Preparation of Pigment Preparations

Example 2

To

| 89.9 parts | of the moist presscake of the pigment according to formula (IX) prepared according to Example 1, having a dry substance content of 42.6%, |
|---|---| were added

| 6.9 parts | of a naphthalenesulfonic acid condensation product (TAMOL ® NN 9401, BASF AG) and |
|---|---|
| 3.2 parts | of deionized water | and the mixture was homogenized by means of a dissolver. The pH of the suspension was 5.5. Thereafter, the suspension was introduced into an open, discontinuously operated 1 liter stirred ball mill (manufactured by Sussmeyer, Brussels) and ground with zirconium oxide beads (diameter 0.4 to 0.6 mm), with cooling, over a period of 3 hours. The resultant aqueous pigment concentrate was formulated to a pigment concentration of 35% with

| 0.1 part | of a preservative (benzisothiazolin-3-one) and deionized water. |
|---|---|

The pigment preparation had excellent flow properties and an excellent stability of the suspension during storage for 3 months at room temperature and 50° C. Aqueous dilutions of this preparation down to a pigment concentration of 2% were also stable. The composition is shown in Table 1.

Example 3

| 22 parts | of the dried pigment according to formula (V) in which $R^9$ is $CONHCH_3$ and $R^{12}$ is H, prepared according to Example 10 of U.S. Pat. No. 5,177,209, and |
|---|---|
| 8.8 parts | of a liginsulfonate (ULTRAZINE ® NA, Lignotech, Dusseldorf) | were beaten and homogenized in

| 69.2 parts | of deionized water |
|---|---| using a dissolver.

Thereafter, grinding was carried out as described in Example 2. The pigment concentrate thus obtained was formulated to a pigment concentration of 20% with

| 0.1 part | of the same preservative as in Example 2 and deionized water, and the pH was brought to 8 by means of dilute sulfuric acid. The preparation also had excellent stability and flow properties. The composition is shown in Table 1. |
|---|---|

Example 4

To

| 90.9 parts | of the most presscake of the pigment according to formula (IV) in which $R^{11}$ is H, prepared according to Example 8 of German Offenlegungsschrift 3,935,858, having a dry substance content of 40.4%, |
|---|---| were added

| 1.8 parts | of a dispersing agent mixture of alkoxylation products according to formula (X) and (XI) having a composition of 51% of formula (X) in which $R^{15}$ is $CH_3$, $R^{16}$, $R^{17}$, and $R^{18}$ are H, m is 2.8, and n is 50 and 49% of formula (XI) in which $R^{15'}$ is $CH_3$, $R^{16'}$, $R^{17'}$, and $R^{18'}$ are H, m' i 2.8, n' is 50, X is $SO_3^-$, and cat is $NH_4^+$, and |
|---|---|
| 7.3 parts | of deionized water, and | the mixture was homogenized by means of a dissolver. The pH was adjusted to 7.0 by means of dilute sodium hydroxide solution. Thereafter, the suspension was ground as described in Example 2 and the pigment concentrate thus obtained was formulated to a pigment concentration of 30% with

| | |
|---|---|
| 0.1 part | of the same preservative as in Example 2 and deionized water. |

The composition is shown in Table 1.

TABLE 1

Compositions for Example 2 to 4 (values in percent by weight based on the pigment concentrate)

| Components (general) | Components (specific) | Examples | | |
|---|---|---|---|---|
| | | 2 | 3 | 4 |
| Water | Deionized water | 58.6 | 71.9 | 68.43 |
| Dispersing agent | ULTRAZINE ® NA | — | 8.0 | — |
| | TAMOL ® NN 9401 | 6.3 | — | — |
| | Dispersing agent mixture | — | — | 1.47 |
| Pigments | Pigment according to formula (IX) (dry) | 35 | — | — |
| | Pigment according to formula (V) (dry) | — | 20 | — |
| | Pigment according to formula (IV) (dry) | — | — | 30 |
| Further additives | Preservative | 0.1 | 0.1 | 0.1 |
| Properties | pH | 6.5 | 8.0 | 6.9 |
| | Maximum particle size* ($\mu$m) | <0.2 | <0.2 | <0.2 |

*Determined from the particle size distribution (weight-average)
[Measurement apparatus: disc centrifuge type DCP ® 1000 from Brookhaven]

Examples 5 to 7
Application Examples

The pigment preparations according to Examples 2 to 4 were each formulated to a pigment concentration of 4% by weight using deionized water and org,anic solvents for use as printing inks for ink-jet printing. The compositions of the pigment preparations to be used as printing inks were each chosen to give printing inks having viscosities in the range of 3 to 5 mPa·s.

The inks were prepared by mixing and stirring the pigment preparations of Examples 2 to 4 with the required amount of water and other additives, such as 20 organic solvents, in a glass container. Thereafter, ultrasonic treatment was carried out for 1 minute, preservative was added and, if appropriate, the pH was adjusted using dilute NaOH. The composition of the pigment preparations used as printing, inks are shown in Table 2.

The pigment preparations were filtered through a 1.2 $\mu$m filter, before printing, in order to remove from the suspension any abraded grinding material and coarse content present.

TABLE 2

Composition and properties of the preparations used as printing inks (values in percent by weight based on the compositions)

| | Examples | | |
|---|---|---|---|
| | 5 | 6 | 7 |
| Deionized water (%) | 79.0 | 70.4 | 77.1 |
| Polyethylene glycol (%) (Molecular weight 400 g/mol) | 4.0 | 4.0 | 4.0 |

TABLE 2-continued

Composition and properties of the preparations used as printing inks (values in percent by weight based on the compositions)

| | Examples | | |
|---|---|---|---|
| | 5 | 6 | 7 |
| 2-Pyrrolidone (%) | 3.9 | 3.9 | 3.9 |
| Isopropyl alcohol (%) | 1.5 | 1.5 | 1.5 |
| Pigment concentrate (%) | | | |
| according to Example 2 | 11.4 | — | — |
| according to Example 3 | — | 20 | — |
| according to Example 4 | — | — | 13.3 |
| Preservative (%) | 0.2 | 0.2 | 0.2 |
| pH | 6.7 | 8.0 | 7.5 |
| Surface tension (mN/m) | >30 | >30 | >30 |
| Maximum particle size ($\mu$m) (disc centrifuge) | <0.2 | <0.2 | <0.2 |

Properties of the Pigment Preparations According to Examples 5 to 7 Used as Printing Inks Prints were produced on a commercially available ink-jet printer from Hewlett Packard (HP DESKJET® 1600 C) using a cleaned cartridge. The printing inks could be used for printing without problems and gave brilliant printed images of high color strength and good contrast.

Lightfastness of the prints on various substrates was carried out using the Xenon Test 450® (apparatus from Heraeus) and, when compared with the similarly exposed blue scale (DIN 54004), gave the results shown in Table 3: The prints also showed a good fastness to water and text marker.

TABLE 3

Lightfastness ratings for Examples 5 to 7

| | Lightfastness rating* on the substrate | | | |
|---|---|---|---|---|
| Printing ink according to | Normal paper AGFA ® 701 | Glossy paper (HP-C 3831A ®) | Coated film (HP-C 3828A/ 32-A ®) | HP special paper (HP-516342 ®) |
| Example 5 | 7–8 | 6–7 | 7 | 7–8 |
| Example 6 | 6–7 | 6 | not tested | not tested |
| Example 7 | 7–8 | 7–8 | 6–7 | 7 |

*Scale ranging from 8 (corresponding to no loss in color) to 1 (corresponding to complete loss in color)

Example 8
Preparation of a Dispersing Agent According to Formula (XI)

In a 2 liter stirred apparatus purged with nitrogen were sequentially added 1500 g (0.9 mol) of tristyrylphenyloxyethylate emulsifier of formula (X)

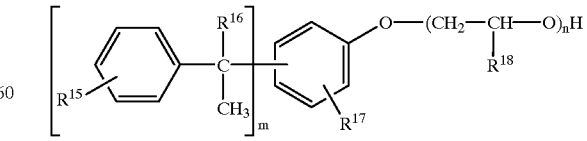

(X)

wherein
m is 2.7, n is 29, and $R^{15}$, $R^{16}$, $R^{17}$, and $R^{18}$ are each H, having a statistical chain length of about 29 EO units (melted at 90° C.), and 90.1 g (0.9 mol) of succinic anhydride at 90 to 100° C.

The mixture was subsequently stirred under a weak stream of nitrogen at 100° C. for 2 hours and then at 150° C. for 3 hours, during which time the initially creamy white mass became thinner and slightly brownish liquid. The mixture was cooled to 100° C. and filtered over a G-2 glass frit, thereby giving 1,480 g of a viscous, slightly cloudy brownish liquid having the following properties:

| | |
|---|---|
| pH at 1% strength in completely desalinated water | 4.6 |
| Turbidity point at 1% strength in completely desalinated water | 94–96° C. |
| Solidification point | about 25° C. |
| Acid number (mg KOH/g) | 29.5 |

The mixture thus obtained contained more than 90% of a dicarboxylic acid half-ester according to formula (XI).

Example 9

| | |
|---|---|
| 4.3 parts | of the dispersing agent mixture described in Example 8 | were melted at 80° C. and added to

| | |
|---|---|
| 7.9 parts | of deionized water and | dissolved completely. The solution was then introduced into

| | |
|---|---|
| 87.8 parts | of a water-moist presscake of Colour Index Pigment Red 122 having a dry substance content of 31.9%, and | the mixture was precomminuted and homogenized by means of a dissolver. During this operation the pH of the suspension was adjusted to 8.0 using dilute sodium hydroxide solution. Thereafter, grinding was carried out as described in Example 2. The resultant aqueous pigment preparation was formulated to a pigment concentration of 25% with

| | |
|---|---|
| 0.1 part | of a preservative (benzisothiazolin-3-one) and deionized water. |

This preparation had very good flow properties and an excellent suspension stability during storage for three months at both room temperature and 50° C.

The preparation thus obtained was diluted to a pigment concentration of 4% for use as a printing ink for ink-jet printing. The composition and properties of the printing ink were chosen as follows:

| | |
|---|---|
| Deionized water | 69% |
| Polyethylene glycol (molecular weight: 800 g/mol) | 10% |
| 25% strength pigment preparation described above | 16% |
| 2-pyrrolidone | 5% |
| pH | 7.2 |
| Surface tension | >30 mN/m |
| Maximum particle size (disc centrifuge) | <0.2 μm |

The printing ink could be used for printing without problems on a commercially available ink-jet printer (analogously to Examples 5 to 7) and gave printed images having high color strength and high brilliance, as well as good fastness to water and text marker.

What is claimed is:

1. A method comprising ink-jet printing with a printing ink containing a pigment preparation comprising
   (a) water,
   (b) 0.1 to 100%, based on the amount of pigment (c), of a dispersing agent, and
   (c) at least one pigment having the formula

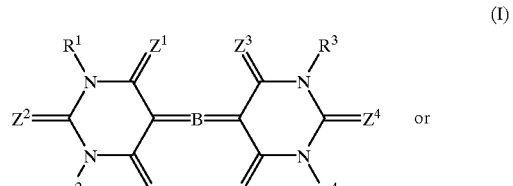

(I)

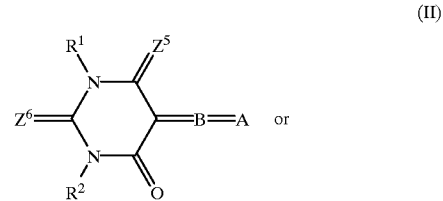

(II)

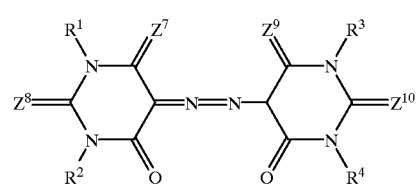

(III)

or tautomeric forms thereof,
wherein
B is an isoindoline group having the formula

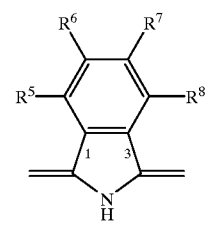

wherein the double bonds are linked respectively through the 1- and 3-positions of the isoindoline group;
A is a cyanomethylene group having the formula

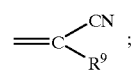

$Z^1$ to $Z^{10}$ are independently O or $NR^{10}$;
$R^1$, $R^2$, $R^3$, and $R^4$ are independently hydrogen, alkyl, cycloalkyl, aryl, aralkyl, or heteroaryl;
$R^5$, $R^6$, $R^7$, and $R^8$ are independently hydrogen, halogen, $C_1$–$C_6$ alkyl, $C_1$–$C_6$ alkoxy, or $C_6$–$C_{10}$ aryloxy;
$R^9$ is an electron-withdrawing group; and
$R^{10}$ is hydrogen or cyano.

2. The method according to claim 1 wherein the pigment preparation contains 10 to 98%, based on the amount of the pigment preparation, of water and 0.2 to 60%, based on the amount of the pigment preparation, of pigment (c).

3. The method according to claim 1 comprising
(a) water;
(b) a dispersing agent;
(c) at least one pigment having the formula

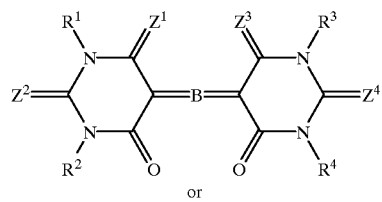

(I)

or

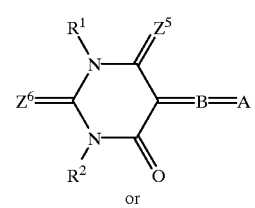

(II)

or

(III)

or tautomeric forms thereof,
wherein
B is an isoindoline group having the formula

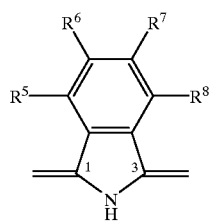

wherein the double bonds are linked respectively through the 1- and 3-positions of the isoindoline group;
A is a cyanomethylene group having the formula

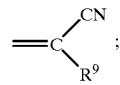

$Z^1$ to $Z^{10}$ are independently O or $NR^{10}$;
$R^1$, $R^2$, $R^3$, and $R^4$ are independently hydrogen, alkyl, cycloalkyl, aryl, aralkyl, or heteroaryl;
$R^5$, $R^6$, $R^7$, and $R^8$ are independently hydrogen, halogen, $C_1-C_6$ alkyl, $C_1-C_6$ alkoxy, or $C_6-C_{10}$ aryloxy;
$R^9$ is an electron-withdrawing group; and $R^{10}$ is hydrogen or cyano; and
(d) at least one organic solvent selected from the group consisting of aliphatic $C_1-C_4$ alcohols, aliphatic ketones, polyols, monohydroxy ethers, 2-pyrrolidone, N-methyl-2-pyrrolidone, N-ethylpyrrolidone, N-vinylpyrrolidone, 1,3-dimethylimidazolidone, dimethylacetamide, and dimethylformamide.

4. The method according to claim 3 wherein the pigment preparation contains 10 to 98%, based on the amount of the pigment preparation, of water; 0.2 to 60%, based on the amount of the pigment preparation, of pigment (c); and 1 to 40%, based on the amount of the pigment preparation, of organic solvent (d).

5. The method according to claim 1 wherein at least one pigment (c) is a compound having the formula

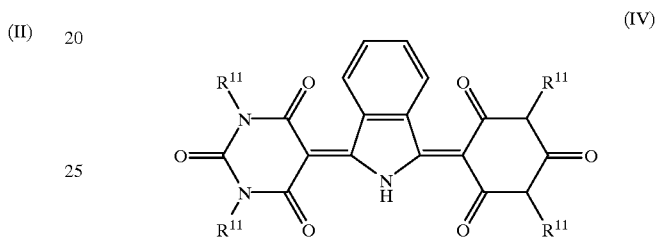

(IV)

wherein $R^{11}$ is hydrogen, $C_1-C_6$ alkyl, or phenyl.

6. The method according to claim 1 wherein pigment (c) is a compound having the formula

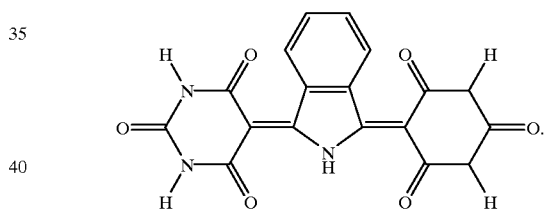

7. The method according to claim 1 wherein pigment (c) is a compound having the formula

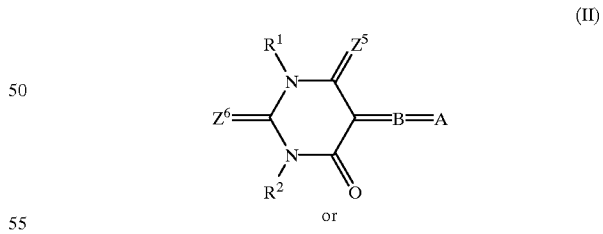

(II)

or

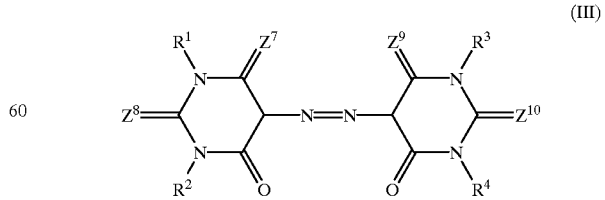

(III)

or tautomeric forms thereof,
wherein

B is an isoindoline group having the formula

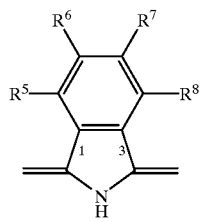

wherein the double bonds are linked respectively through the 1- and 3-positions of the isoindoline group;

A is a cyanomethylene group having the formula

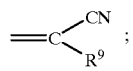

$Z^5$ to $Z^{10}$ are independently O or $NR^{10}$;

$R^1$, $R^2$, $R^3$, and $R^4$ are independently hydrogen, alkyl, cycloalkyl, aryl, aralkyl, or heteroaryl;

$R^5$, $R^6$, $R^7$, and $R^8$ are independently hydrogen, halogen, $C_1$–$C_6$ alkyl, $C_1$–$C_6$ alkoxy, or $C_6$–$C_{10}$ aryloxy;

$R^9$ is an electron-withdrawing group; and $R^{10}$ is hydrogen or cyano.

8. The method according to claim 1 wherein at least one pigment (c) is a compound having the formula (V)

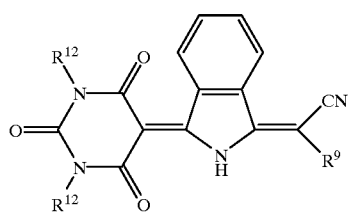

wherein $R^9$ is —CN, aminocarbonyl or aminocarbonyl substituted with $C_1$–$C_6$ alkyl, $C_5$–$C_7$ cycloalkyl, aralkyl, $C_1$–$C_6$ alkoxycarbonyl, $C_6$–$C_{10}$ aryloxycarbonyl, or heteroaryl having the formula (VI)

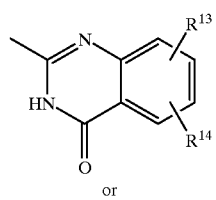

or (VII)

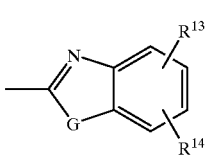

wherein $R^{13}$ and $R^{14}$ are independently hydrogen, halogen, $C_1$–$C_6$ alkyl, $C_1$–$C_6$ alkoxy, or $C_1$–$C_6$ alkoxycarbonyl, or $R^{13}$ and $R^{14}$ together form a fused-on benzene ring, G is O, S, NH, or $N(C_1$–$C_4$ alkyl), and $R^{12}$ is hydrogen, $C_1$–$C_6$ alkyl, or phenyl.

9. The method according to claim 1 wherein pigment (c) is a compound having the formula

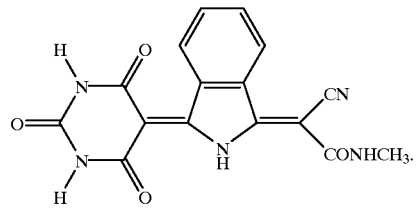

10. The method according to claim 1 wherein at least one pigment (c) is a compound having the formula (III)

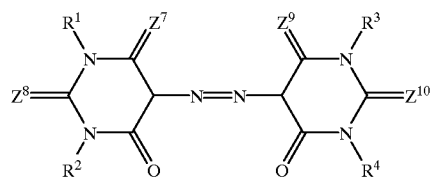

or a tautomeric form thereof, wherein $Z^7$ to $Z^{10}$ are independently O or $NR^{10}$;

$R^1$, $R^2$, $R^3$, and $R^4$ are independently hydrogen, alkyl, cycloalkyl, aryl, aralkyl, or heteroaryl; and $R^{10}$ is hydrogen or cyano, said compound being present as a salt, a complex, an inclusion compound, a solid solution, or an intercalation compound.

11. The method according to claim 1 wherein pigment (c) is a compound having the formula (VIII)

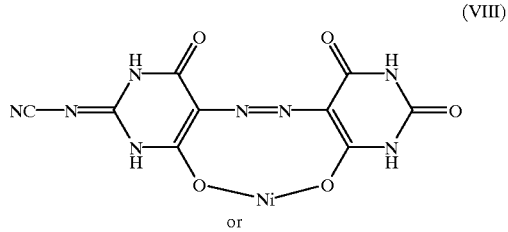

or (IX)

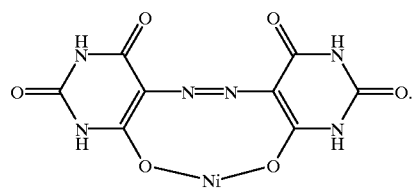

12. The method according to claim 1 wherein the pigment is present in the form of an inclusion compound or an intercalation compound, wherein the compound being included or intercalated is a cyclic or acyclic carboxamide or sulfonamide, a urea or substituted urea, or a heterocyclic compound.

13. The method according to claim 1 wherein pigment (c) is a compound having the formula

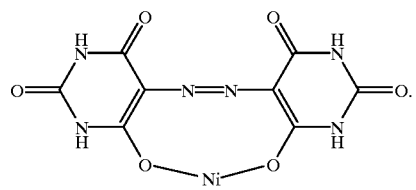

14. A pigment preparation comprising (a) water;

(b) a dispersing agent;

(c) at least one pigment having the formula

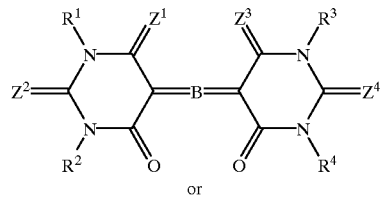

(I)

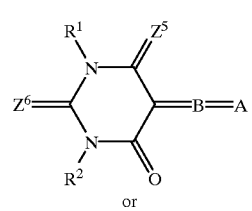

(II)

or

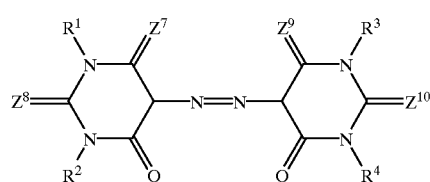

(III)

or tautomeric forms thereof, wherein

B is an isoindoline group having the formula

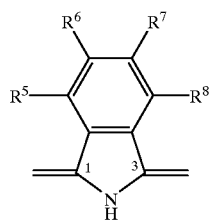

wherein the double bonds are linked respectively through the 1- and 3-positions of the isoindoline group;

A is a cyanomethylene group having the formula

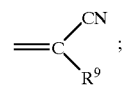

$Z^1$ to $Z^{10}$ are independently O or $NR^{10}$;

$R^1$, $R^2$, $R^3$, and $R^4$ are independently hydrogen, alkyl, cycloalkyl, aryl, aralkyl, or heteroaryl;

$R^5$, $R^6$, $R^7$, and $R^8$ are independently hydrogen, halogen, $C_1$–$C_6$ alkyl, $C_1$–$C_6$ alkoxy, or $C_6$–$C_{10}$ aryloxy;

$R^9$ is an electron-withdrawing group; and $R^{10}$ is hydrogen or cyano; and (d) at least one organic solvent selected from the group consisting of aliphatic $C_1$–$C_4$ alcohols, aliphatic ketones, polyols, monohydroxy ethers, 2-pyrrolidone, N-methyl-2-pyrrolidone, N-ethylpyrrolidone, N-vinylpyrrolidone, 1,3-dimethylimidazolidone, dimethylacetamide, and dimethylformamide.

15. The pigment preparation according to claim 14 wherein pigment (c) is a compound having the formula

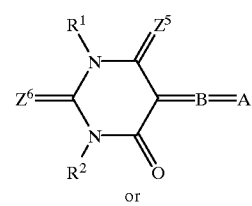

(II)

or

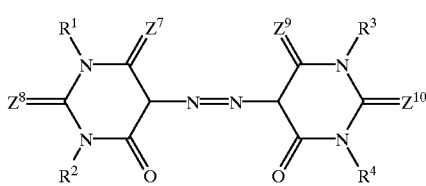

(III)

or tautomeric forms thereof, wherein

B is an isoindoline group having the formula

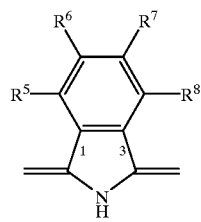

wherein the double bonds are linked respectively through the 1- and 3-positions of the isoindoline group;

A is a cyanomethylene group having the formula

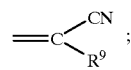

$Z^5$ to $Z^{10}$ are independently O or $NR^{10}$;

$R^1$, $R^2$, $R^3$, and $R^4$ are independently hydrogen, alkyl, cycloalkyl, aryl, aralkyl, or heteroaryl;

$R^5$, $R^6$, $R^7$, and $R^8$ are independently hydrogen, halogen, $C_1$–$C_6$ alkyl, $C_1$–$C_6$ alkoxy, or $C_6$–$C_{10}$ aryloxy;

$R^9$ is an electron-withdrawing group; and $R^{10}$ is hydrogen or cyano.

16. The pigment preparations according to claim 14 wherein at least one pigment (c) is a compound having the formula

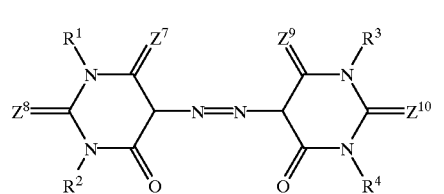

(III)

or a tautomeric form thereof,
wherein
$Z^7$ to $Z^{10}$ are independently O or $NR^{10}$;
$R^1$, $R^2$, $R^3$, and $R^4$ are independently hydrogen, alkyl, cycloalkyl, aryl, aralkyl, or heteroaryl; and
$R^{10}$ is hydrogen or cyano, said compound being present as a salt, a complex, an inclusion compound, a solid solution, or an intercalation compound.

17. The pigment preparations according to claim 16 wherein the pigment is present in the form of an inclusion compound or an intercalation compound, wherein the compound being included or intercalated is a cyclic or acyclic carboxamide or sulfonamide, a urea or substituted ureas, or a heterocyclic compound.

18. The pigment preparation according to claim 14 wherein pigment (c) is a compound having the formula

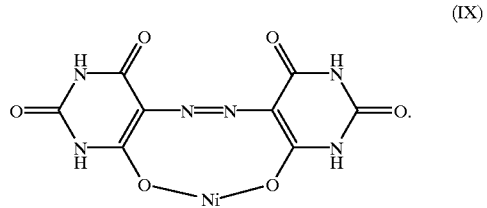

(IX)

* * * * *